Oct. 18, 1966   B. G. BJORNSEN ET AL   3,279,489
FLUID CONTROL
Filed Sept. 30, 1963                    2 Sheets-Sheet 1

INVENTORS.
BJORN G. BJORNSEN
THOMAS J. LECHNER, JR.
BY Andrus & Starke
ATTORNEYS Oct. 18, 1966     B. G. BJORNSEN ET AL     3,279,489
FLUID CONTROL
Filed Sept. 30, 1963     2 Sheets-Sheet 2

INVENTORS.
BJORN G. BJORNSEN
THOMAS J. LECHNER, JR.
BY Andrus & Starke
ATTORNEYS United States Patent Office 3,279,489
Patented Oct. 18, 1966

3,279,489
FLUID CONTROL
Bjorn G. Bjornsen, Milwaukee, and Thomas J. Lechner, Jr., Menomonee Falls, Wis., assignors to Johnson Service Company, Milwaukee, Wis., a corporation of Wisconsin
Filed Sept. 30, 1963, Ser. No. 312,550
11 Claims. (Cl. 137—81.5)

This invention relates to a pure fluid control device having a pair of perpendicularly interacting fluid streams providing a controlled pressure or flow output.

Interacting streams can provide pure fluid control systems wherein a main power stream is controlled by a low power or control stream without necessity of any mechanically moving components for accomplishing functions similar to other pneumatic, electrical and mechanical systems. Such pure fluid systems are particularly useful in performing functions similar to those of analog and digital electronic devices in control systems but can also be employed in direct control of power operated mechanism and systems.

Generally, pure fluid amplifiers or modulators have employed a pair of interacting streams which may be conveniently identified as a main or high power stream existing between a suitable emitter orifice and one or more collector orifices and a control or low power signal stream directed against the side of the power stream. Such fluid modulators operate on the principle of transfer of momentum at the point of intersection with the power stream being deflected by the control stream in accordance with the relative strength of the control stream. The amount of the pressure or flow of the main stream collected at the output orifice is inversely proportional to the strength of the control stream. In this manner, a small signal stream can control a large signal stream and the modulator functions as an amplifying control.

Generally, recent fluid amplifying devices of this character have suggested employing enclosed chambers and passageways for the power stream, the control stream and the mixing or interacting chambers. Any change in the loading of the device, however, is reflected in a signal flow or stream and cascading of such fluid devices requires isolation relays and the like to prevent mutual loading and provide impedance matching when maximum power transfer is desired.

The present invention is particularly directed to an improved pure fluid modulating device of the open type to provide complete separation of the input impedance from the load and is further directed to an improved means of controlling the relationship of the main power stream and the control stream.

In accordance with the present invention, the main stream and the perpendicularly related control stream are provided by orifices with a chamber or mixing region which is vented or open to an ambient providing a reference pressure with isolation of the load signal and the control signal. Applicants have found that by proper design of a fluid modulator of this type and in particular relating the geometric parameters of the nozzle openings and their spacing in relation to the stream size, a highly efficient and useful three terminal modulator is provided. Applicants have further discovered that a multi-stage, direct-coupled pure fluid amplifier of the deflection control type can be constructed by employing impedance matching buffer stages. In such structures, a unitary base member is formed with the appropriate orifices and chambers, with common output-input orifices between adjacent or successive stages.

In accordance with a novel and highly useful feature of the present invention, a linear restrictor including a pair of axially movable opposed stream orifices controls the stream strength in a pure fluid device by axial adjustment of the pair of opposed and aligned orifices. The control stream in a three terminal fluid modulator would be established by a pair of axially aligned and spaced orifices which are relatively movable along an axial flow line to change the strength of the control stream and therefore the output of the modulator.

In a preferred construction of the three terminal unit, a fixed stream forming opening constitutes the final control stream emitting orifice. A control orifice is movably mounted to the back side of the emitting orifice and is axially positioned with respect to the stream forming orifice within a reference chamber or space which is also vented and maintained at the reference pressure of the main intermixing region or gap. Maximum gain is provided when the control signal gap is reduced to zero and minimum gain when the gap is maximum. As the control signal gap varies therebetween, the momentum of the control stream from the orifice changes with a resultant change in stream deflection of the main stream and correspondingly the gain changes between maximum and a value near zero depending on the control gap size.

Although the latter feature is of general application, it provides a particularly satisfactory feedback unit in a fluid control unit. In accordance with this aspect of the present invention, the main power stream of the modulator is fed to a high gain fluid amplifier and the output signal of this amplifier is fed back as a control signal to the three terminal modulators. The feedback gain is adjusted by changing the signal control gap. The adjustable signal control gap between the control signal orifices presents a constant orifice size and load to the output tap or side of the high gain amplifier. The gap adjustment of the movable orifice provides a linear control of the control stream strength which with the constant load impedance allows accurate modulation of the feedback pressure. In this manner, the total gain of the complete system can be controlled and provide linear control of the output signal.

The present invention can also be employed with the adjustable nozzle as a set point and gain control unit. Thus, by suitable selection of the main stream and the control stream, a plurality of static input-output curves can be established having a common set point with the slope of the individual curves determined by the setting of the control gap.

The present invention can also be employed as an impedance matching device to transform a signal of high pressure and high internal impedance to a low pressure and low internal impedance or the reverse thereof by proper selection of the relationship of the geometric parameters. The present device functions on the principle of conservation of energy and thus may control the impedance by supplying a large mass at low velocity or a large velocity and low mass depending upon whether a low impedance or high impedance characteristic is present.

Impedance matching is important for example in the cascading of pure fluid amplifying stages. Input and output impedance of the successive stages should be matched. Although isolation relays can be employed, the present invention can be employed to provide an impedance matching or buffer stage. As previously noted, the reference chamber or mixing region prevents transmission of the output back through the stream to the input of each stage and successive stages therefore have the output orifice of the one stage formed with or constituting the input signal orifice of the second unit. Thus, an intermediate buffer stage is designed with the proper parameters to provide the impedance matching between the amplifying stages.

The proper physical dimensions of the signal orifice basically controls the signal momentum.

The present invention thus provides an improved fluid modulator or control having an input impedance which is not varied by variations in the output. The modulator of the present invention allows direct adjustment of the momentum of the control stream in a very simple and efficient manner. Multiple stage pure fluid amplifiers may be constructed with maximum power transfer between amplifying stages without the usual isolation relays or the like.

The drawings furnished herewith illustrate the best modes presently contemplated for carrying out the invention in its several aspects.

Figure 1:
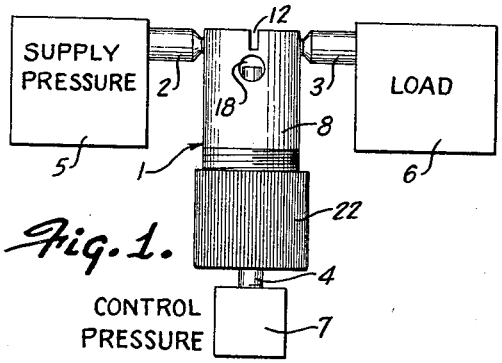
FIG. 1 is an elevational view of a three terminal fluid modulator construction in accordance with the present invention.

Referring to the drawings and particularly to FIG. 1, a three terminal fluid modulator 1 is illustrated having an input signal line 2 and an output signal line 3 secured in axially opposed relation to opposite sides thereof and having a control signal line 4 secured to the bottom thereof in perpendicular relationship to the lines 2 and 3. An input signal pressure unit 5 is connected to the line 2 and is adapted to establish a main stream directed to and collected, as subsequently described, at line 3. A suitable flow or pressure operated load or output unit 6 is connected to the line 3 and actuated by the collected pressure or flow of the main stream. A control signal pressure unit 7 is connected to the signal line 4 and establishes a deflecting or control stream which interacts with and proportionately deflects the main stream to control the pressure or flow at line 3, as presently described.

Figure 2:
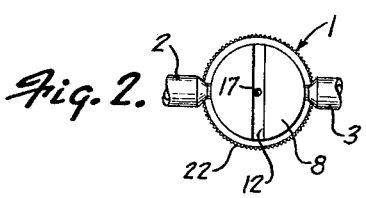
FIG. 2 is a top view of a portion of FIG. 1.
Figure 3:
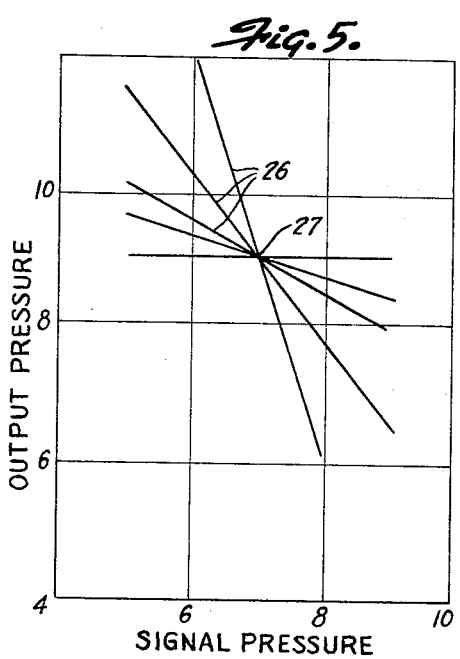
FIG. 3 is an enlarged vertical section of the modulator shown in FIGS. 1 and 2.

Referring particularly to FIGS. 1–3, the illustrated three terminal fluid modulator 1 includes a cylindrical metallic body 8 having a radial inlet opening 9 adjacent the upper portion thereof within which a reduced tubular portion of inlet line 2 is secured. The inlet opening 9 terminates in a conical base 10 having a small aperture or orifice 11 extending from opening 9 to a reference chamber 12 which is formed by a slot extending normal to the axis of orifice 11 in the upper surface of the body 8. An outlet opening 13 similar to opening 9 is provided in the opposite side of the body 8 and includes an orifice 14 corresponding to and axially aligned with the orifice 11 in FIG. 3.

The input signal pressure unit 5 establishes a main power stream 15 between orifice 11 and orifice 14. The pressure and flow in line 3 is dependent upon the alignment of the stream 15 and the orifice 14 which is controlled by a control stream 16 from line 4. As most clearly shown in FIG. 3, control stream 16 extends perpendicularly to the path of the main power stream 15 and intersects and merges with the main stream 15 within chamber 12. A control stream forming aperture or orifice 17 is provided in the base portion of the reference chamber 12 and communicates with a reference pressure chamber 18 defined by a laterally formed cylindrical opening extending through the cylindrical body 8 in spaced relation to the reference chamber 12, in the illustrated embodiment of FIGS. 1–3. An adjustable control tube or nozzle 19 is slidably mounted in sealed relation within an opening extending outwardly through body 8 in axial alignment with the small orifice 17 and is connected at its outer end to signal source 7. The upper end of the nozzle 19 terminates within chamber 18 and is closed except for a control stream emitting orifice 20 aligned with orifice 17 but of a somewhat smaller diameter than the orifice 17. Stream 16 originates at nozzle 20, the boundary layer flaring outwardly toward orifice 17 from which the stream is directed with a constant diameter into engagement with the main stream 15. The nozzle 19 is axially positionable to vary the length of gap 21 between orifices 17 and 20 and thereby varying the strength of stream 16, as follows.

The exterior lower portion of the body 8 is threaded to receive a positioning nut 22 through which the nozzle 19 projects. A biasing coil spring 23 encircles nozzle 19 within body 18 between a shoulder formed by enlarging the outer portion of the nozzle receiving opening and a small washer 24 secured to the outer portion of the nozzle 19 and held in engagement with the nut 22 by spring 23. The positioning nut 22 is threaded onto the body 8 to force the nozzle 19 upwardly against the bias of the compressed spring 23 and hold the inner end of the nozzle 19 spaced from the control stream forming orifice 17. The gap length between orifices 17 and 20 for a given pressure in line 4 from control source 7 determines the momentum of the signal stream 16 flowing from the orifice 17 and intersecting with the main or power stream 15 and thereby controls the deflection of the main stream 15. The orfices 17 and 20 constitute a linear restrictor for controlling the momentum of stream 14 and therefore the gain of the device from maximum to zero.

The operation of the illustrated embodiment of FIGS. 1 and 2 is briefly summarized as follows. The main power stream 15 and the intersecting control stream 16 are established by the respective stream forming pressure units 5 and 7. If load 6 is dead ended, presenting an infinite impedance load to stream 15, a pressure is established in the output line 3 directly related to the kinetic energy of the collected stream less any losses. If load 6 is a finite load, the pressure within the output line 3 is reduced in accordance with the flow which in turn is directly related to the pressure at the collector orifice 14.

The control stream 16 striking and merging with the main power stream 15 causes a proportionate deflection of the stream 15 with respect to the output orifice 14 and thereby varies or controls the output pressure or flow, generally functioning as a negative gain amplifier.

With the nozzle 19 positioned to eliminate the signal control gap, the main stream 15 is deflected to miss the orifice 14 completely and thereby provide maximum gain. As the gap between the fixed orifice 17 and the emitting orifice 20 is increased, the negative gain decreases to a value near or approaching zero.

It is particularly important for optimum operation that the stream interaction occur in a reference chamber such as chamber 12 in order to prevent the output collected pressure at orifice 14 and line 3 from affecting the control stream 16. With this construction, the input flow and pressure is independent of the load flow which may vary without effecting the impedance of the input signal.

Figure 4:
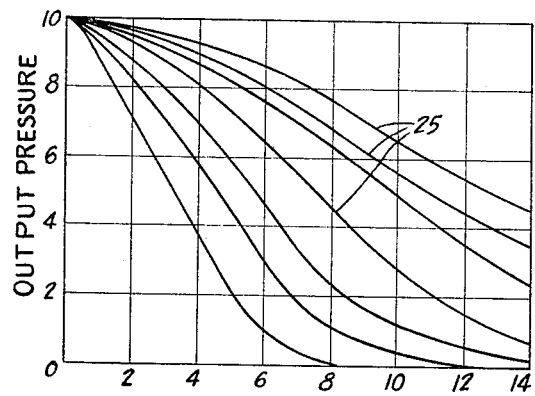
FIG. 4 is a set of illustrative amplification curves for the described modulator.

FIG. 4 illustrates a set of amplification curves 25 of signal pressure versus output pressure, each curve being related to a different setting of the signal control gap 21. The uppermost curve 25 corresponds to a maximum gap and the lowermost curve corresponds to a minimum gap. In each instance, the maximum gain is established by the selection of the size and spacing of the several orifices. Positioning of nozzle 19 to change the setting of the control signal gap 21 directly changes the characteristic or shape of the curve as shown.

The adjustable gap 21 provides a very convenient, simple and linear control of the gain characteristics of a pure fluid device.

Figure 5:
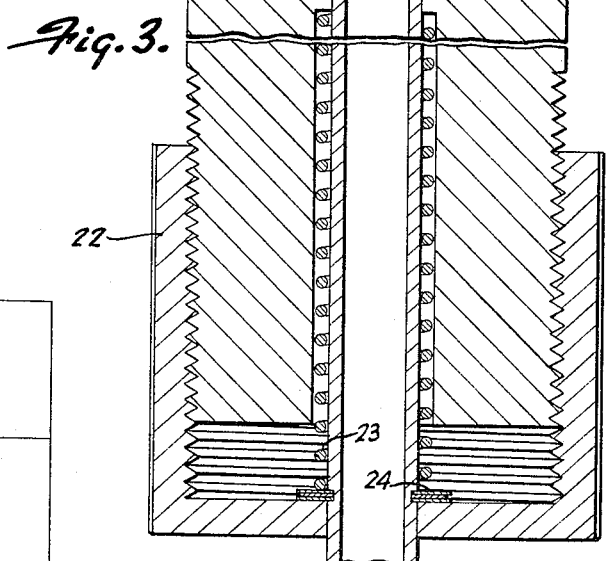
FIG. 5 is a set of illustrative idealized amplification curves for the described modulator operating as a set point amplifier.

Further, the illustrated three terminal amplifier or modulator can be used as a set point and gain adjustment wherein a signal of one level can produce an amplified signal at another. For example, FIG. 5 includes a plurality of typical static input-output curves or plots 26 having a common or set point 27 established at a control signal of 7 p.s.i.g. and an output signal of 9 p.s.i.g. The particular control curve which is followed depends upon the selection of the main supply pressure from source 5 and the signal control gap 21 established by positioning of the control nozzle 19. The selected set point 27, within the capability of the modulator, is arbitrary and can be changed by changing the supply pressure of source 5 and the gap 21. The unit so constructed can thus be applied to adjust the input level to a fluid device to that of the incoming signal.

Figure 6:
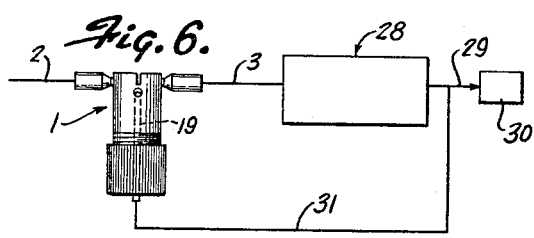
FIG. 6 is a diagrammatic illustration of a feedback unit constructed in accordance with this invention.

The invention provides an exceptionally satisfactory pressure summing device in a pure fluid feedback control system, such as shown diagrammatically in FIG. 6.

Referring particularly to FIG. 6, the three terminal modulator 1 is shown having the output line 3 connected as the input to a fluid pressure high gain amplifier 28 having an output line 29 to a load 30. Amplifier 28 may be of any suitable construction providing the necessary high gain characteristics. A feedback line 31 connects the output line 29 to the adjustable nozzle 19 of the modulator 1 which acts as a feedback amplifier or summing point device.

The output pressure at line 29 over the input pressure at line 2 is the gain of the overall system and this is directly proportional to the forward gain of the amplifier 28 over one plus the product of the forward gain and the feedback gain. As a result, if the product of the forward gain and the feedback gain is much greater than unity, the overall gain is essentially inversely proportional to the feedback gain.

The nozzle 19 presents a constant feedback orifice to the output and thus provides a constant load impedance to the output of the high gain amplifier 28. Additionally, the linear restrictor formed by orifices 17 and 20 provides a linear adjustment of the feedback pressure in accordance with changes in length of the control signal gap 21. The linearity of the total system is dependent upon the linearity of the feedback or summing point device.

The present invention can also be employed with or without the adjustable nozzle 19 for impedance matching. With a high internal impedance, only a relatively low flow can be extracted from the source without a prohibitive reduction in the signal potential whereas with a low internal impedance, a relatively large flow can be extracted without detrimental effects. Thus, where a high internal impedance is encountered, it may be desirable to translate through a buffer stage or fluid device to a low impedance signal from which a relatively large flow can be extracted.

In accordance with the present invention, any change in the output signal is dependent on the momentum interchange of the streams which is in turn directly related to the product of the mass and the velocity of the required momentum of the signal stream which can be established in either of two ways; that is supplying a large mass at low velocity or a low mass at a large velocity. Thus, to change a low impedance signal to a high impedance signal, the signal orifice is made relatively large with respect to the supply orifice and the output orifice between which a main stream is provided. The main stream is then a small diameter flow at high velocity and the signal orifice is a large diameter flow at low velocity. The net signal momentum is maintained and provides a high pressure, high internal impedance signal.

If the signal has a relatively high impedance, however, and the load requires a substantial flow, the main stream is established as a large flow, small velocity signal and the signal is applied to the control nozzle as a small flow, high velocity signal. In this manner, the high internal control signal impedance is reflected at the output in a relatively large flow, low velocity signal or as a low impedance input. Very negligible flow of the control stream will provide the necessary gain control in accordance with the requirements of the system.

The flow or pressure recovery is then generally independent of the flow pressure. The recovery is directly related to the geometry of the unit and particularly the ratio of the output orifice size to the supply orifice size and the distance between the supply orifice wall and the collecting orifice wall.

In the following derivation, certain assumptions were made to produce workable equations and subsequent construction and operation has shown that the resulting equations predict operation with reasonable accuracy. The respective streams 15 and 16 are assumed to be essentially incompressible to facilitate the mathematical analysis; for example, air streams under 30 p.s.i.g. pressure. The stream following the point of interaction is further assumed to contain essentially the total mass of the individual streams. The streams prior to interaction should be composed practically and essentially of only parallel vectors such that they can be assumed to consist of parallel and unretarded portions prior to contact and interaction.

Figure 7:
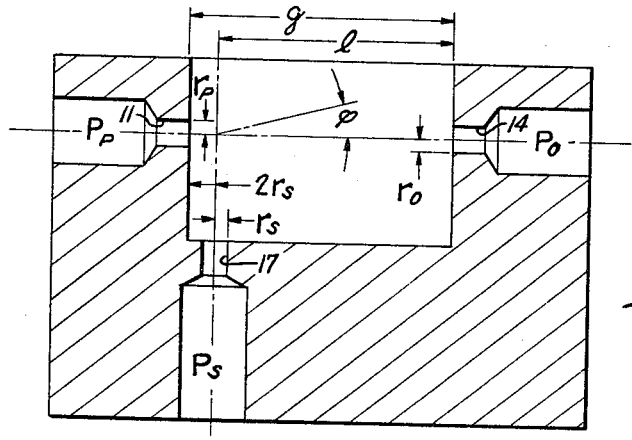
FIG. 7 is a diagrammatic illustration of a three terminal fluid modulating device showing the important geometric relationship between the orifices.

A schematic illustration of a three terminal modulator is shown in FIG. 7 for clarity of explaining the several important geometric factors of the modulator with corresponding components in FIGS. 3 and 7 similarly numbered.

In the following discussion, the following nomenclature is employed:

$g$ = the length or distance between the main stream orifice 11 and the collector orifice 14.

$l$ = the length or distance between the signal orifice 17 and the collector orifice 14.

$r$ = the radius of the respective orifices 11, 14 and 17, which are distinguished by subscripts $p$ for supply, and $o$ for output and $s$ for signal, respectively.

$q$ = volumetric flow, with the subscript noted for $r$ being similarly applied.

$u$ = kinetic energy of a stream.

Important nondimensional ratios include:

$$R_o = \frac{r_o}{r_p} \qquad R_s = \frac{r_s}{r_p} \qquad R = \frac{R_s}{R_o}$$

$$L = \frac{l}{r_p} \qquad G = \frac{q}{r_p} \qquad Q_r = \frac{q_o}{q_p} \qquad U = \frac{u_o}{u_s}$$

The power ratio U is related to the kinetic energy of the respective streams and in terms of the change from the signal to the output $u_o$ divided by $u_s$. The kinetic energy or momentum of a stream is determined by the volumetric flow and area or radius and thus U may be expressed as being equal to the ratios $$\left(\frac{r_s}{r_o}\right)^4 \left(\frac{q_o}{q_s}\right)^3 \text{ or } R^4 Q^3$$

It is found that the flow recovery curves of the flow recovery ratio versus the gap ratio closely approximate straight lines generally conforming to the equation: $Q_r$ (flow recovery ratio without an input signal at orifice 11)

$$= 1.344 R_o - 0.0257 G - 0.292$$

Applicants have further found that the distance from the supply wall of orifice 11 to the center line of the signal orifice 17 should be essentially equal to twice the radius of the signal orifice 17, such that $$G = \frac{g}{r_D} = \frac{l}{r_D} + \frac{2r_s}{r_D} = L + 2R_s$$

Theoretically, the control signal stream 16 would for optimum amplification be positioned in alignment with the discharge edge of the main supply orifice 11. However, applicants have found that if the control stream 16 is too close to the wall containing main orifice 11, the device will not operate satisfactorily. It appears that as the control stream 16 approaches the adjacent wall, an interaction occurs causing the control stream to lock on the wall and disperse into a relatively widespread flat stream with resulting minimum intersection and interaction with stream 16. Although the wall configuration can be varied as by removing or recessing the wall between the orifice 11 and the base of chamber 12, this introduces increased manufacturing problems and costs as well as edge effects immediately at the discharge edge of orifice 11. Further, as previously noted, the control stream 16 produces optimum predictable operation when the stream vectors are essentially parallel at the point of intersection. This result can be obtained by making the distance from the main stream 15 to the discharge edge of the control stream orifice 17 approximately equal to the radius of the main stream orifice 11, although shown somewhat greater in the drawing for clarity of illustration.

The power recovery ratio can then be written in terms of the output orifice ratio, the signal orifice ratio and the length ratio by substitution of the above equation into the previous flow recovery equation. Further, based on the above equations, it can be shown that the optimum length ratio L providing a maximum overall power ratio, and maximum overall flow gain ratio, is equal to the following equation:

$$L \text{ opt} = \frac{2}{3}\left[\lambda - \frac{2}{3}\beta^2 + 3.92R_s + \sqrt{\frac{2}{3}\beta^2\left(\lambda + \frac{2}{3}\beta^2 + \frac{3.92}{2}R_s\right)}\right]$$

where $$\lambda = \frac{1}{R_s}\sqrt{4.7 + R_o}$$

and $$\beta = \frac{4.7R_s - 3.92}{2\sqrt{4.7 + R_o}}$$

The power and flow ratio optimized with respect to the length ratio is seen to be a function of only the variables ratios $R_o$ and $R_s$. As a result, the length ratio versus the geometric $R_s$ and the overall power ratio optimized with respect to L versus the geometric $R_s$ can be plotted for constant values of $R_o$ and $R'$ to provide impedance matching curves, generally corresponding to the set of curves shown in FIGS. 8 and 9 wherein the constant values of $R_o$ and R have been noted.

Figure 10:
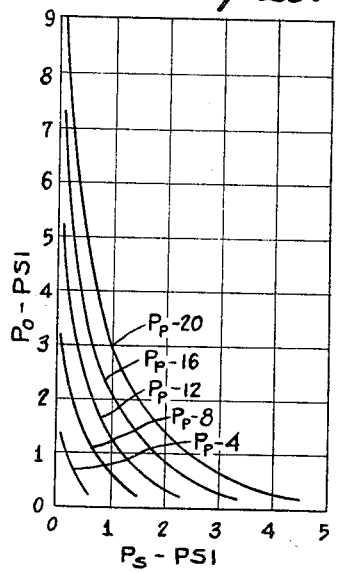
FIG. 10 is a set of amplification characteristics for the unit.

In the several embodiments of the invention shown in the drawings, a single unitary body or base member is shown. Although certain aspects of the invention such as the linear restrictor control can be employed in any construction, the integrated assembly disclosed herein simplifies the manufacture of the unit and permits the accurate positioning and formation of the several orifices. Various amplifying devices have been constructed with orifices varying between .002 and .100 inch and the following is a specific example of a modulator corresponding to the configuration of FIG. 7 with the following dimensions which was operated in accordance with the previous analysis as an amplifier:

$r_p = .0100$ inch $\quad g = 0.188$ inch
$r_s = 0.125$ inch $\quad l = 0.163$ inch
$r_o = 0.0125$ inch The unit was operated with compressed air at several fixed supply pressures and a varying control signal pressure. The resulting curves are shown in FIG. 10, with the curves appropriately labeled with the several main supply pressure $P_p$ of 20, 16, 12, 8 and 4 pounds per square inch. The gain characteristic is clearly shown by the large change in output pressure $P_o$ for relatively small changes in signal pressure $P_s$.

Figure 11:
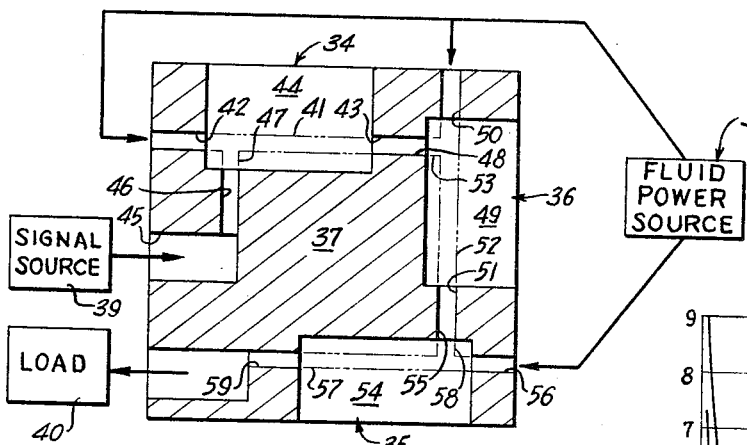
FIG. 11 is a vertical longitudinal view through a two stage amplifier illustrating an integral buffer stage for impedance matching with a pure fluid system.

In providing of amplification stages as previously mentioned, generally the output impedance of a high pressure gain amplifier is high and the input impedance is low making it very difficult to directly cascade the stages. As a result, isolation relays have been required. In pure fluid systems therefore there is a definite need for a pure fluid isolation relay or buffer stage to establish the necessary impedance matching. A particularly satisfactory method and structure providing a cascaded amplifier system is shown in FIG. 11, including an intergrated amplifier unit having a first amplifying stage 34 and a second amplifying stage 35 interconnected by a buffer stage 36 all of which are integrated into a single base or body portion 37. A main stream source 38 and a control stream source 39 are coupled to the first stage 34 and a load 40 is connected to the output side of the second amplifying stage 35.

The first stage 34 can have a relatively low internal impedance but normally for high gain amplification will have a high output impedance. To properly connect this amplifying stage to the second amplifying stage 35, the buffer amplifying stage 36 connects the two stages to match impedances, as follows.

The first stage 34 includes the main supply stream 41 between the emitter aperture or orifice 42 which is connected to the power source 38 and a collector orifice 43 on the opposite side of a reference opening chamber 44. The reference chamber 44 is formed by a lateral slot in the upper surface of the base 37 as illustrated in FIG. 7. A signal tap opening 45 is formed on the right central portion of the base 37 and communicates with a small signal orifice 46 which is located to direct the control stream 47 into perpendicular intersection with the main stream 41.

In cascading amplifier stages, maximum power transfer between the stages is generally desired and this requires that the output impedance of the one input stage be equal to the load impedance of the subsequent stage, which in cascaded amplifiers is the input impedance of the following stage. In accordance with the present invention, the stages 34 and 36 are cascaded with the output or collector orifice 43 of the first stage 34 integral with the input orifice 48 of the subsequent or buffer stage 36. In this manner, the output stream of the first stage 34 is the control signal stream of the buffer stage 36 and a continuous dynamic action is maintained without any conversion to a pressure signal and reconversion to a control stream.

The buffer stage 36 is formed on the right side of the illustrated base 37 with control orifice 48 constituting an integral and continuous extension of the collector orifice of the first stage 34 and terminating in communication within a reference chamber 49 which is formed by a slot formed in the right side of base 37. A main stream emitting orifice 50 is provided in the upper wall of the base 37 defining chamber 49 and an aligned collector orifice 51 is provided in the lower or opposite wall of chamber 49. Emitting orifice 50 is connected to the power source 38 to establish a main buffer stream 52 between orifices 50 and 51. The signal stream 53 from orifice 48 intersects the main stream 52 at right angles and provides an output signal proportional thereto. Maximum power transfer is established from the first amplifying stage 34 to the buffer stage 36 as a result of the integral input-output orifice and creates a control signal at the orifice 50 of proper impedance for the second amplifying stage 35. Thus, the orifices 50 and 51 are selected with a known pressure to provide the desired impedance as subsequently discussed.

The second amplifying stage 35 includes a reference chamber 54 formed in the underside of the base 37 illustrated in FIG. 11 with a control signal orifice 55 constituting an integrated extension of the output or collector orifice 51 of buffer stage 36. A main stream orifice 56 is provided in the right side of the reference chamber 54 and connected to the power source 38 to establish a main stream 57. The control stream 58 formed by the main stream of buffer stage 36 intersects with the main stream to produce the amplified output at a collector orifice 59 on the opposite side of the reference chamber 54.

In designing a cascaded amplifier, a procedure similar to that followed in connection with electronic devices has been found to provide accurate and highly satisfactory results.

Thus, given two fluid amplifiers to be cascaded and having different output and input impedances, they can be readily matched if constructed in accordance with the geometric configuration discussed in connection with FIG. 7 and the integrated structure of FIG. 11. Thus, knowing the individual stage construction and particularly the relationship of $r_o$ of the first stage and $r_s$ of the second stage and available pressure, the buffer stage can be determined with the output orifice of each stage and the input signal orifice of the successive stage common or integral as shown in FIG. 11. If $r_s$ of the second stage is equal to K and $r_o$ of the first stage is equal to 1.1K and the maximum available output flow from the first stage is a quantity of $c$ with a signal flow required by the second stage in order to obtain cutoff of 1.1 times $c$, the buffer stage is to have the following requirements, where the subscripts $b$, 1 and 2 refer respectively to the buffer stages 1 and 2:

$$R_b = \frac{r_{o1}}{r_{s2}} = \frac{1.1K}{k} = 1.1$$

where $r_{o1}$ corresponds to $r_s$ of the buffer stage and $r_{s2}$ corresponds to the signal input orifice of the second stage as a result of the integrated structure:

$$Q_b = \frac{q_{s2}}{q_{o1}} \left(\frac{\text{cutoff}}{\text{maximum}}\right) = \frac{1.1c}{c} = 1.1$$

Figure 8:
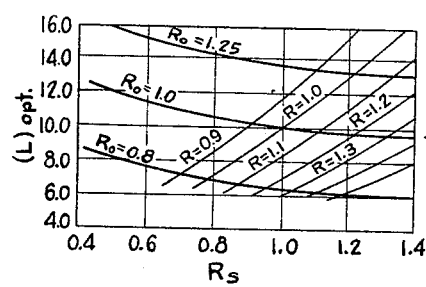
FIG. 8 is a set of curves illustrating characteristics of a device such as shown in FIG. 7 for optimum arrangement of a control orifice with respect to a collecting orifice.
Figure 9:
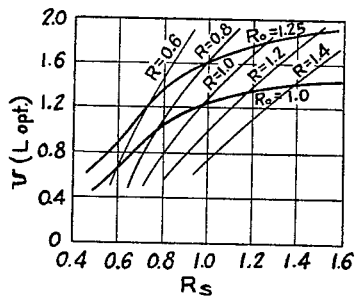
FIG. 9 is another set of impedance matching curves illustrating the power ratio characteristic of the device.

The overall power ratio required of the buffer stage is $U_b = R_b^4 \cdot Q_b^3 = 1.61$. The figures of $R_b = 1.1$ and $U_b = 1.61$ with reference to the respective impedance matching curves of FIG. 9 show that $$R_{sb} = \frac{r_{sb}}{r_{pb}} = 1.25$$

and from the equation given, FIG. 8, $L$ (opt.) = 11.8 from which the remaining geometry of the emitting orifice of the buffer stage and its spacing can be determined, as follows:

$$R_{sb} = 1.25 = \frac{r_{sb}}{r_{pb}} = \frac{r_{o1}}{r_{pb}} \quad \therefore r_{pb} = \frac{1.1K}{1.25}$$

$$G_b = L_b + 2R_{sb} = 11.8 + 2(1.25) = \frac{q}{r_{pb}}$$

$$\therefore G = 14.3[r_{pb}] = 14.3 \frac{1.1K}{1.25} = 13.68K$$

The supply flow for the buffer stage can be obtained from the flow recovery equation and knowing the supply orifice size, the supply pressure can be determined.

A most important concept set forth above and shown in the drawings is the integration of the several stages with the integrated common output-input orifices and with the geometry of one being directly related to the other. Further, the action of pure fluid control devices appears highly complex and the exact functioning depends on the type of fluid and flow as well as the general magnitude of the pressures and flows as will be obvious to those skilled in the art.

The present invention thus provides an improved deflection type fluid amplifier permitting direct coupling in multiple stage units and further provides an improved linear control for the control stream which is particularly useful in provision of a controllable feedback signal. The pure fluid modulating unit of this invention is also particularly adapted to miniaturization as a result of its integrated construction.

Various modes of carrying out the invention are contemplated as being within the scope of the following claims particularly pointing out and distinctly claiming the subject matter which is regarded as the invention.

We claim:
1. In a pure fluid modulating device,
   (a) a first stream emitter orifice adapted to be coupled to a fluid source and establishing a rectilinearly moving main stream,
   (b) a collector orifice mounted for collecting said stream,
   (c) a control stream forming orifice mounted between the emitter and collector orifices for directing a control stream perpendicularly intersecting the main stream on one side of the main stream between the emitter and collector orifices, and
   (d) a control orifice aligned with the forming orifice to the same side of the emitter orifice and adapted to be connected to a fluid source and establishing therefore the control stream from the forming orifice, the strength of the control stream at the intersection with the main stream being proportional to the gap between the forming orifice and the control orifice.
2. The pure fluid modulating device of claim 1 wherein,
   (a) said control orifice is adjustably mounted with respect to said forming orifice for changing of the gap therebetween.
3. A pure fluid amplifying unit of the stream deflection variety,
   (a) a body member having a main reference chamber with a main stream emitter orifice and a collector orifice in opposite walls thereof and having a common center line and a control stream forming orifice connecting the reference chamber to the control reference chamber, said control stream forming orifice having a center line normal to said common center line, and
   (b) a control nozzle having an orifice substantially coaxially aligned with the forming orifice to the same side of the emitter orifice for establishing a control stream from the control orifice and the forming orifice and adjustable axially of the forming orifice within the control reference chamber to adjust the gap therebetween and thereby vary the strength of the control stream from the forming orifice.
4. In an amplifying system,
   (a) a pure fluid amplifier having a main stream orifice for establishing a main stream and a collector orifice for collecting the main stream and a signal orifice for establishing a signal stream interacting with the main stream and controlling the position of the main stream with respect to the collector orifice,
   (b) a high gain fluid amplifier having an input line connected to said collector stream orifice and having an output line, and
   (c) a linear restrictor comprising a pair of generally coaxially aligned feedback orifices mounted for relative axial movement to define a gap of an adjustable length between the feedback orifices, one of said orifices being connected to the output line and the other of said orifices being connected to the signal orifice to provide a feedback path from the output line to the signal orifice, the relative position of the feedback orifices setting the feedback gain.

5. In a pure fluid amplifying system,
 (a) a stream deflection amplifying unit including a main reference chamber having a main stream emitting orifice and a collector orifice on opposite walls of the reference chamber and a control stream orifice unit disposed between the emitter orifice and the control orifice and to one side of the emitter orifice,
 (b) said control stream orifice unit including a stream forming orifice between a control reference chamber and the main reference chamber and a control emitting orifice aligned with the forming orifice on the same side of the emitter orifice and axially adjustably mounted to vary the length of the gap between the forming orifice and the control emitting orifice, a control stream flowing from the control emitting orifice through the reference chamber of the forming orifice, and
 (c) a high gain fluid amplifier connected between the collector orifice and the control emitting orifice to provide direct adjustable feedback from the collector orifice to the emitting orifice and thereby to the control stream with the overall gain of the system essentially inversely proportional to the feedback gain determined by the setting of the length of the gap between the forming orifice and the control stream emitting orifice.

6. The pure fluid amplifying system of claim 5 having,
 (a) said stream deflection amplifying unit including a unitary body with said chambers and orifices formed therein and with the forming orifice having its center line spaced one forming orifice diameter from the main stream emitting orifice and the center line of the latter spaced one emitting orifice diameter from the control orifice.

7. In a pure fluid modulating device employing a pair of perpendicularly related streams one of which is a main stream acted upon intermediate its total length by a perpendicular control stream, a control stream device which comprises,
 (a) a pair of opposed orifices located to one side of the main power stream and defining a portion of the control stream passageway, one of said orifices being an inlet orifice and the other being a discharge orifice for a control stream, and
 (b) means to move said control orifices relative to each other, the force of the control stream from the discharge orifice being controlled by the spacing between the control orifices.

8. The pure fluid modulating device of claim 7 wherein the diameter of the inlet orifice is smaller than the diameter of the discharge orifice.

9. In a pure fluid modulating device,
 (a) a main stream emitter having in one wall an emitter orifice for establishing a main stream flowing therefrom and having an outwardly extending wall laterally spaced from the main stream,
 (b) a collector orifice aligned with and spaced from said emitter orifice by a predetermined gap, and
 (c) a control orifice formed in said laterally spaced wall establishing a control stream perpendicular to the main stream, said control orifice having its center line spaced from the emitter orifice by the diameter of the control orifice, and said control orifice being spaced from the center line of the main stream by the diameter of the emitter orifice.

10. An integrated pure fluid amplifying device comprising,
 (a) a solid self-supporting integral body having a generally rectangular recess in one side thereof defining a reference chamber, said body being provided with an emitter orifice and a collector orifice in opposite side walls of the reference chamber and a perpendicular control orifice in the base wall of the reference chamber to provide a control stream generally perpendicularly intersecting a main stream flowing from the emitter orifice to the collector orifice, and
 (b) the center line of the control orifice being spaced one control orifice diameter from the side wall of the emitter orifice and the center line of the emitter orifice being spaced one emitter orifice diameter from the base wall of the control orifice.

11. A pure fluid modulating unit comprising,
 (a) an emitting orifice and an opposed spaced collecting orifice and a control orifice perpendicularly related to the first named orifices,
 (b) fluid source means for establishing a main stream from the emitting orifice to the collecting orifice and a control stream from the control orifice to the main stream,
 (c) said control orifice being spaced intermediate the emitting orifice and collecting orifice substantially in accordance with the equation: $G = L + 2R_s$ where $G$ = ratio of the distance between the exit edge of the emitting orifice and the entrance edge of the collecting orifice and the radius of the emitting orifice, $L$ = the ratio of the distance between the center line of the control orifice and the entrance edge of the collecting orifice and the radius of the emitting orifice, and $R_s$ = the radius ratio of the control orifice over the emitting orifice.

References Cited by the Examiner
UNITED STATES PATENTS

| | | | |
|---|---|---|---|
| 3,075,548 | 1/1963 | Horton | 137—81.5 X |
| 3,128,040 | 4/1964 | Norwood. | |
| 3,175,569 | 3/1965 | Sowere | 137—81.5 |
| 3,180,346 | 4/1965 | Duff | 137—81.5 |
| 3,182,686 | 5/1965 | Zilberfarb | 137—81.5 X |
| 3,185,166 | 5/1965 | Horton et al. | 137—81.5 |
| 3,191,611 | 6/1965 | Bauer | 137—81.5 |
| 3,207,168 | 9/1965 | Warren | 137—81.5 |

FOREIGN PATENTS

| | | |
|---|---|---|
| 1,083,607 | 6/1960 | Germany. |

M. CARY NELSON, *Primary Examiner.*

S. SCOTT, *Assistant Examiner.*

UNITED STATES PATENT OFFICE
CERTIFICATE OF CORRECTION

Patent No. 3,279,489                          October 18, 1966

Bjorn G. Bjornsen et al.

It is hereby certified that error appears in the above numbered patent requiring correction and that the said Letters Patent should read as corrected below.

Column 6, lines 55 and 60, second ratio, for "$G=\dfrac{q}{r_p}$" read -- $G=\dfrac{g}{r_p}$ --; column 9, lines 66 and 68, the equation should appear as shown below instead of as in the patent:
$$G_b = L_b + 2R_{sb} = 11.8 + 2(1.25) = \dfrac{g}{r_{pb}}$$

Signed and sealed this 12th day of September 1967.

(SEAL)
Attest:

ERNEST W. SWIDER                                EDWARD J. BRENNER
Attesting Officer                                        Commissioner of Patents